United States Patent [19]

Crane et al.

[11] Patent Number: 5,085,779

[45] Date of Patent: Feb. 4, 1992

[54] POLYETHYLENEIMINE MATRIXES FOR AFFINITY CHROMATOGRAPHY

[75] Inventors: Laura J. Crane, Buttzville, N.J.; Sunil V. Kakodkar, Bethlehem, Pa.

[73] Assignee: J. T. Baker, Inc., Phillipsburg, N.J.

[21] Appl. No.: 703,576

[22] Filed: May 17, 1991

Related U.S. Application Data

[63] Continuation of Ser. No. 362,725, Jun. 7, 1989, abandoned, which is a continuation-in-part of Ser. No. 191,223, May 6, 1988, abandoned.

[51] Int. Cl.$^5$ ............................................. B01D 15/08
[52] U.S. Cl. ................................... 210/635; 210/656; 210/198.2; 210/502.1
[58] Field of Search ............ 210/635, 656, 198.2, 210/502.1; 502/401, 402; 530/413, 417

[56] References Cited

U.S. PATENT DOCUMENTS

| | | | |
|---|---|---|---|
| 4,177,038 | 12/1979 | Biebricher | 210/635 |
| 4,350,760 | 9/1982 | Nicolas | 210/635 |
| 4,435,504 | 3/1984 | Zulk | 210/658 |
| 4,438,198 | 3/1984 | Schmer | 435/178 |
| 4,522,724 | 6/1985 | Ramsden | 210/635 |
| 4,523,997 | 6/1985 | Crane | 210/635 |
| 4,524,137 | 6/1985 | Hagerdal | 435/178 |
| 4,540,486 | 9/1985 | Ramsden | 210/198.2 |
| 4,661,248 | 4/1987 | Ramsden | 210/502.1 |
| 4,721,573 | 1/1988 | Ramsden | 210/635 |
| 4,770,774 | 9/1988 | Ida | 210/635 |
| 4,808,313 | 2/1989 | Michizuki | 210/500.28 |
| 4,814,098 | 3/1989 | Inada | 210/695 |
| 4,839,419 | 6/1989 | Kraemer | 210/656 |
| 4,851,210 | 7/1989 | Hewett | 210/500.29 |

OTHER PUBLICATIONS

Winzor, "Biospecific Reactions", Journal of Chromatography, 492 (1989), pp. 390–391.
Mikes Laboratory Handbook of Chromatographic and Allied Methods, John Wiley and Sons, New York, 1979, pp. 406–407.
Snyder, Introduction to Modern Liquid Chromatography, John Wiley and Sons, Inc., 1979, pp. 173–177.
Parikh, "Affinity Chromatography", C+EN, Aug. 26, 1985, pp. 17–29 and 32.
Tang, "Affinity Chromatography", Adv. Biochem. Bioengg., 25, 43 (1982), pp. 19–21.

Primary Examiner—Ernest G. Therkorn
Attorney, Agent, or Firm—Parmelee, Bollinger & Bramblett

[57] ABSTRACT

Affinity chromatography matrixes and immobilized enzymes are provided in which the solid support is a covalently bound, non-crosslinked polyethyleneimine bonded phase.

6 Claims, No Drawings

POLYETHYLENEIMINE MATRIXES FOR AFFINITY CHROMATOGRAPHY

This is a continuation of application Ser. No. 362,725, filed on June 7, 1989, which, in turn, is a continuation of Ser. No. 191,223, filed on May 6, 1988, both now abandoned.

FIELD OF THE INVENTION

This invention relates to the field of affinity chromatography and immobilized enzymes and to affinity matrixes for use in affinity chromatography.

BACKGROUND OF THE INVENTION

Affinity chromatography is a separation and purification technique that is based upon a unique and fundamental biological property of biological molecules, namely their selective, specific high-affinity recognition of and reversible molecular interaction with other molecules. Most biological macromolecules have a substrate or functional binding site for a specific ligand or an effector molecule, which itself may be another protein.

In general, a specific ligand is covalently attached to a solid support matrix. A sample containing the biological molecule which will specifically bind (absorb) to the immobilized ligand is brought into contact with the immobilized ligand. After unabsorbed and contaminating molecules are removed, the specifically bound molecule is eluted from the solid support by disrupting the specifically bound molecule-ligand interaction by one of several procedures, such as by changing the ionic strength or pH of elution buffers.

By this procedure, immobilized drugs, vitamins, peptides, hormones and the like may be used to isolate corresponding receptors or transport proteins. Immobilized protein can serve to isolate other complementary or interacting proteins. Similarly, such a procedure can be used to separate particulate biological specimens, such as cell membranes and even intact cells bearing specific receptors. Use of such a procedure is also useful to purify polynucleotides, antigens, antibodies, virus, enzymes and the like. In addition, such solid based affinity support matrixes have been utilized to immobilize enzymes for use in reactions as catalysts and the like.

Heretofore, the most widely used solid matrixes for affinity chromatography have been polysaccharide based matrixes, such as agarose, cellulose and crosslinked dextrin, although crosslinked polyacrylamides and silica or microporous glass beads have also been used.

However, with most such solid matrixes and especially with silica based solid matrixes, the solid base material is not sufficiently shielded from the molecules in the biological sample of interest with the result that non-specific binding, in the nature of absorption with materials other than the specific binding partner of the immobilized ligand, occurs. With the silica based solid matrixes heretofore utilized strong hydrogen bonding and absorption at silanol groups occurs and is disruptive of the process. Moreover, the aqueous solutions that must be employed with the proteins or other biological material of interest cause undesirable hydrolysis of the silica matrixes, leaching undesirable material from the matrixes, resulting in unstable matrixes.

With the heretofore used solid support matrixes employed in affinity chromatography one could generally only use such supports for about 200 to 300 hours in aqueous solutions and even less in acid or alkaline pH environments. Furthermore, such prior art matrixes could not tolerate any exposure to 0.1N NaOH.

Thus, the development of affinity chromatography has been inhibited to a great extent by these drawbacks of the presently used solid support matrixes, particularly due to the absorption of non-specific materials and instability of the matrixes.

It is therefore desirable that solid support matrixes for affinity chromatography be provided which eliminate or substantially reduce the risk of non-specific binding and which are stable under a variety of pH conditions and in aqueous solutions.

SUMMARY OF THE INVENTION

It has now been discovered that covalently bound, non-crosslinked polyethyleneimine silica based solid phase supports provides affinity chromatography matrixes that are of greatly improved stability in aqueous, acid and alkaline environments and substantially reduce or virtually eliminate absorption of non-specific molecules. The covalently bound, non-crosslinked polyethyleneimine silica based solid supports employed to provide the affinity chromatography matrixes of this invention are the reaction products of polyethyleneiminopropyl trimethoxy silane with particulate silica gel or particulate controlled pore glass and is designated by the formula

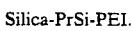
Silica-PrSi-PEI.

The term Silica-PrSi-PEI as used in this invention means the covalently bound, non-crosslinked polyethyleneimine bonded phase solid support which is the reaction product of (1) either a) particulate silica gel having an average particle diameter of from about 1 to 200, preferably 3 to 70, microns and an average pore size of from about 0 to 1000, preferably about 50 to 1000 Angstrom units, or b) particulate controlled pore glass having an average particle diameter of from about 1 to about 200 microns and a average pore size of from about 0, preferably about 40, to about 1000 Angstrom units, with (2) polyethyleneiminopropyl trimethoxy silane having an average molecular weight of from about 400 to about 1800, or the weakly acidic carboxylated product thereof with a dibasic acid anhydride, said carboxylated product containing from about 0.3 to about 1.2 carboxyl milliequivalents per gram. Such Silica-PrSi-PEI products, their carboxylated derivatives and their preparation are disclosed and claimed in U.S. Pat. No. 4,540,486 of Hugh Ramsden, issued Sept. 10, 1985. Such products are currently available from J. T. Baker Inc. as BAKERBOND ® column chromatography matrixes.

The affinity chromatography matrixes of this invention are derivatized Silica-PrSi-PEI matrixes in which the primary and secondary amino groups of the polyethyleneimine moiety are reacted with a reactive moiety which is capable of forming covalent linkages with ligands under non-denaturing conditions and is stable under aqueous hydrolytic buffer conditions.

Thus, affinity chromatography matrixes of this invention may be represented by the generalized formula

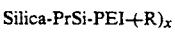
Silica-PrSi-PEI-(-R)$_x$ where R in the case of the non-weakly acidic carboxylated support is the residue of any chemically reactive moiety capable of undergoing nucleophilic substitution at two separate sites, such that R becomes covalently linked to the primary and secondary amino groups of the PEI at one such site while having the other site available and reactive for subsequent nucleophilic substitution under non-denaturing conditions by an affinity chromatography ligand to form a second covalent bond stable under aqueous hydrolytic buffer conditions and x is an integer less than or equal to the total number of primary or secondary amino groups in the PEI moiety, and in the case of the weakly acidic carboxylated support R is the residue of any chemically reactive moiety capable of facilitated nucleophilic displacement of the carboxyl hydroxyl to form a covalent bond at the carboxyl carbon, creating thereby a sufficiently electrophilic site, so as to be readily displaced at the carboxyl carbon by a nucleophilic functional group on an affinity chromatography ligand, and x is an integer less than or equal to the total number of carboxyl groups in the carboxylated PEI moiety. As examples of R residues of moieties reactive with the primary and secondary amino or carboxyl groups of the PEI moiety and meeting the other aforementioned conditions there may be mentioned the residues:

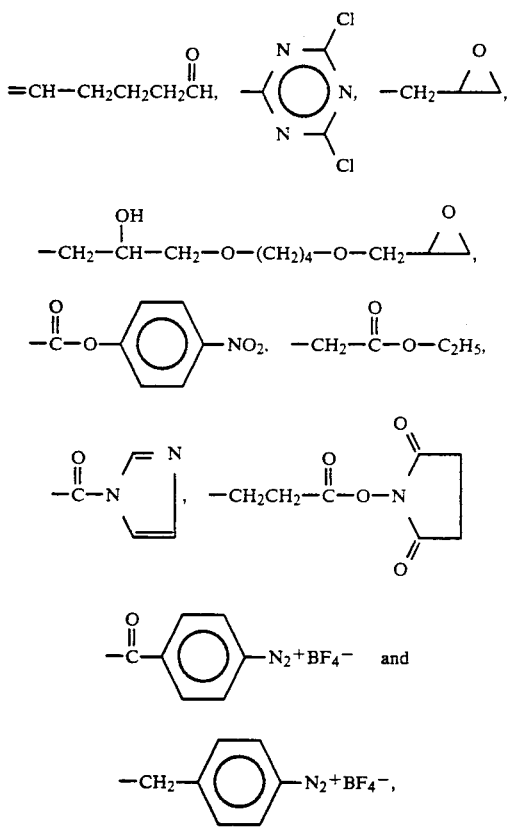

which are derived from: glutaraldehyde, cyanuric chloride, epichlorohydrin, 1,4 butanediol diglycidyl ether, p-nitrophenyl chloroformate, ethylchloroacetate, 1,1'-carbonyldiimidazole, diazotized p-nitrobenzaldehyde fluoborate salt and diazotized p-nitrobenzoyl chloride fluoborate salt, respectively.

The affinity matrixes of this invention can be used for binding to any ligand which covalently bonds to the affinity matrix. The affinity matrix is especially useful for reacting with ligands having reactive amino groups although it is also quite useful for reacting with ligands having other reactive groups such as, for example, ligands containing reactive hydroxyl, sulfhydryl and the like groups. The affinity matrixes of this invention readily react with such reactive groups of a protein, enzyme or other such ligand to yield the ligand immobilized on the affinity matrix. As examples of ligands containing such reactive groups which can be immobilized on the affinity matrixes of this invention by covalent binding thereto, there can be mentioned, for example, antigens, antibodies, enzymes, inhibitors, cofactors, hormones, vitamins, toxins, growth factors, glycoconjugates, lectins, nucleic acids and proteins which are known in the art, such as disclosed in Parikh, I. et al., Affinity Chromatography, C&EN, 17-24,32, Aug. 26, 1985. The ligand bound affinity matrixes of this invention are employed to purify or separate substances, such as, for example, proteins from solutions containing such substances by binding or adsorbing the substance in solution with an affinity matrix of this invention having a ligand covalently bound to the affinity matrix. Among such substances to be separated or purified there can be mentioned, for example, enzymes, receptors, antibodies, antigens, nucleic acids and the like.

In addition, the affinity matrixes of this invention can be used to immobilize enzymes, either as ligands for affinity chromatography, as mentioned hereinbefore, or as immobilized enzymes for use as reaction catalysts. Such immobilized enzymes, immobilized on the affinity matrixes of this invention, are highly active and stable catalysts and retain their appropriate specificity. Such immobilized enzyme catalysts can be reused, permit continuous reactions, provide better reaction control and result in higher purity and yield of products. Moreover, such immobilized enzyme catalysts will generally result in less pollution due to reduction or elimination of the loss of enzyme catalyst. The use of such immobilized enzymes finds wide application in a variety of enzyme catalyzed reaction, for example, in processes for the production of L-amino acids.

EXAMPLE 1

To 25.0 g of Silica-PrSi-PEI (40 μ, 2.8% N, 0.05 meg) in a reaction vessel, 13.0 g (0.128 mol) of triethylamine was added along with 100 ml of chloroform 27.6 g (0.115 ml) of cyanuric chloride was added at about 20° C. The reaction was very exothermic. Additional 200 mol of chloroform was added and the mixture was stirred at about 20° C. for about 5¼ hours, filtered, washed 3×100 ml chloroform and dried at about 80° C. for about 4 hours. Yield=26.2 g. Analysis: C=10.74%; H=2.11%; N=6.32%; Cl=5.52%.

EXAMPLE 2

300 ml of chloroform was placed in a reaction vessel fitted with a thermometer, a stirrer and a condenser and was cooled to about 0°-5° C. by means of ice and salt. 27.6 g (0.15 mol) of cyanuric chloride was added during 20 minutes while maintaining the temperature between about 0°-5° C. Then 15.0 g (0.15 mol) of triethylamine was added in one shot and the suspension turned yellow and the temperature rose to about 25° C. The solution was then cooled again to about 0°-5° C. and 25.0 g of Silica-PrSi-PEI (40 μ, 2.8% N, 0.05 meg) was added to small lots during about a 20 minutes interval while maintaining the temperature about 0°-5° C. The reaction mixture was stirred at that temperature for about 30 minutes after which the ice bath was removed and the mixture was stirred for about 22 hours, filtered, washed 3×100 ml chloroform and then dried at about 0° C. for about 4 hours. Yield=25.4 g. Analysis: C=10.22%; H=2.12%; N=5.78%; Cl=5.59%.

EXAMPLE 3

25 g of Silica-PrSi-PEI (40 μ, 2.8% N, 0.05 meg) was suspended in 100 ml of chloroform, to which 15.0 g (0.15 mol) of triethylamine was added. 28.0 g of triazine was slurried with 200 ml of chloroform and transferred to the reaction vessel with a very exothermic reaction occurring. The mixture was stirred for about 5½ hours at about 20° C., filtered, washed 3×100 ml chloroform and dried at about 80° C. for about 4 hours. Yield=26 g. Analysis: C=10.95%; H=2.12%; N=5.96%; Cl=5.63%.

EXAMPLE 4

In a reaction vessel 50.0 g of Silica-PrSi-PEI (40 μ, 2.8% N, 0.05 meg) was suspended in 200 ml of chloroform to which 29.0 g of triethylamine was added. 20.0 g of cyanuric chloride was gradually added and the rest of the cyanuric chloride was slurried with 200 ml of chloroform and was transferred to the reaction vessel with a very exothermic reaction occurring The mixture was stirred for about 5¼hours at about 20° C., filtered, washed 3×200 ml chloroform, dried at about 80° C. for about 4 hours. Yield=51 g. Analysis: C=10.71%; H=2.14%; N=5.88%; Cl=5.33%

EXAMPLE 5

400 ml of chloroform was suspended in a reaction vessel fitted with a condenser, stirrer and a thermometer and was cooled down to about 0°-5° C. by means of ice and salt. 56 g (0.29 mol) of cyanuric chloride was added to the cooled chloroform solution during about 15-20 minutes while maintaining the temperature at about 0°-5° C. 36 g (0.35 mol) of triethylamine in 50 ml of chloroform was added dropwise during about 30 minutes keeping the temperature under about 10° C. The solution turned yellow after the addition of triethylamine was complete. The mixture was cooled to about 0°-5° C. and 50.0 g of Silica-PrSi-PEI-triazine, produced according to Example 4, was added while keeping the temperature under about 10° C. The addition of silica was complete in about 10 minutes. The reaction mixture was stirred at that temperature for about 10 minutes after which the ice bath was removed and the mixture was stirred at about 20° C. for about 18¼ hours, filtered, washed with 4×250 ml chloroform and dried at about 80° C. for about 4 hours. Yield=49 g. Analysis: C=11.3%; H=2.25%; N=6.31%; Cl=4.86%.

EXAMPLE 6

In a reaction vessel 250 g Silica-PrSi-PEI (40 μ, 2.8% N, 0.05 meg) and 100 ml 25% glutaraldehyde solution were mixed. The mixture was kept on a shaker for about 4 hours at about 20° C. The mixture turned light brown, was filtered after about 4 hours, washed 3×100 ml deionized water, 3×100 ml methanol and 3×100 ml acetone, dried at about 20° C. in a vacuum oven overnight to a constant weight. Yield=26 g. Analysis: C=15.43%; H=2.48%; N=2.34%.

EXAMPLE 7

25 g of Silica-PrSi-PEI (40 μ, 2.8% N, 0.05 meg) was placed in a 500 ml round bottom flask and 5.1 g (0.05 ml) triethylamine in 100 ml of tetrahydrofuran was added, followed by 10.15 g (0.05 mol) p-nitrophenyl chloroformate and an additional 150 ml of tetrahydrofuran. The mixture was kept on a shaker for about 16 hours at about 20° C., then filtered, washed with 4×125 ml chloroform and dried at about 80° C. for about 4 hours. Yield=26 g. Analysis: C=9.73%, H=2.51%; N=3.26%.

EXAMPLE 8

25 g of Silica-PrSi-PEI (40 μ, 2.8% N, 0.05 meg) was suspended in 250 ml of tetrahydrofuran and 10.12 g (0.1 mol) of triethylamine was added followed by 9.32 (0.01 mol) of epichlorohydrin. The mixture was kept on a shaker for about 19 hours at 20° C., then filtered, washed 2×250 ml tetrahydrofuran, 2×250 ml chloroform and 2×250 ml acetone and dried at about 80° C. for about 4 hours. Yield=25.5 g. Analysis: C=7.84%; H=1.61%; N=2.63%.

EXAMPLE 9

In a reaction vessel 25 g of Silica-PrSi-PEI (40 μ, 2.86% N, 0.05 meg) was suspended in 250 ml of tetrahydrofuran and 11.25 g (0.055 mol) of 1,4 butanediol glycidyl ether was added. The mixture was placed on a shaker for about 8 hours at about 20° C., then filtered, washed 3×100 ml methanol and dried at about 80° C. for about 4 hours. Analysis: C=7.09%; H=1.62%; N=2.36%.

EXAMPLE 10

Example 9 was repeated except the product was washed with 3×100 ml acetone and 3×100 ml diethyl ether. Analysis: C=7.13%; H=1.61%; N=2.75%.

EXAMPLE 11

10 g (0.061 ml) of 1,1'-carbonyldiimidazole was suspended in 150 ml of acetone and the suspension was added to 25 g of Silica-PrSi-PEI (40 μ, 2.8% N, 0.05 meg) in a reaction vessel. An additional 100 ml of acetone was added to the reaction vessel and it was kept on rotary film evaporator for about 18 hours at about 30° C. The product was filtered, washed 3×250 ml acetone, 1×250 mol diethylether and dried at about 80° C. for about 4 hours. Yield=26 g. Analysis: C=8.99%; H=1.72%; N=3.98%.

EXAMPLE 12

25 g of Silica-PrSi-PEI (C=5.92%, H=2.82%, 0.05 meg) was suspended in 125 ml of tetrahydrofuran and 5.05 g (0.05 mol) of triethylamine was added and the reaction mixture was stirred at about 20° C. for about 10 minutes after which 6.12 g (0.05 mol) of ethylchloroacetate was added and followed by 125 ml of tetrahydrofuran. The reaction mixture was stirred at about 20° C. on a shaker for about 24 hours then filtered, washed 2×250 ml chloroform, 2×250 ml acetone and dried at about 80° C. for about 4 hours. Analysis: C=6.61%; H=1.67%; N=2.80%.

EXAMPLE 13

2.5 g (0.013 ml) of 1-(3-dimethylaminopropyl)-3-ethylcarbodiimide hydrochloride was dissolved in 50 ml of acetone:2-propanol (1:1). 1'3 g (0.011 mol) of N-hydroxysuccinimide was suspended in 100 ml of acetone and kept on a shaker (this did not go completely in solution). 25 g of succinoylated Silica-PrSi-PEI (C=11.89%, H=1.86%, N=2.69%, carboxyl group=0.95 meg/g) was placed in a reaction vessel and the solution of 1-(3-dimethylaminopropyl)-3-ethylcarbodiimide hydrochloride in acetone-2-propanol was added. The reaction vessel was shaken for about 5 minutes, then the solution of N-hydroxy succinimide in acetone was added followed by 25 ml of 2-propanol. The reaction vessel was kept on a shaker for about 22 hours then the product was filtered, washed 2×250 ml isopropanol, 2×250 ml acetone and dried at about 80° C. for about 4 hours. Yield=26.4 g. Analysis: C=13.60%; H=2.14%, N=3.38%.

EXAMPLE 14

Preparation of diazo affinity chromatography matrixes according to this invention can be prepared according to the following procedures.

A) Silica-PrSi-PEI is reacted with p-nitrobenzaldehyde in methanol and the resulting product reacted with sodium borohydride in methanol. The product is suspended in sodium dithionite solution at about 60° C. The resulting product is reacted with ice cold $HBF_4$ and the product is filtered, washed with ice water and dried under vacuum to yield the desired diazonium fluoborate product:

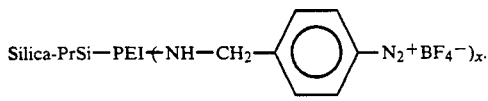

B) Silica-PrSi-PEI is reacted with p-nitrobenzoyl chloride in tetrahydrofuran and triethylamine and the resulting product is suspended in a sodium dithionite solution followed by treatment of the reaction product with ice cold $HBF_4$, filtering, washing with ice water and drying of the product under vacuum to yield the desired diazonium fluoborate product:

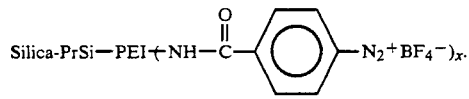

EXAMPLE 15

10 g of Glutaraldehyde PEI-Silica Gel affinity matrix, produced according to Example 6, was washed with 0.1M phosphate (pH 8.0) until the pH of the effluent was equal to the pH of the wash (equilibration) buffer. 20.0 ml of 25 mg/ml Human IgG solution (in 0.1M phosphate buffer, pH 8.0) was added to the affinity matrix. A concentrated protein solution was used in order to keep reaction volume small and the reaction was allowed to proceed overnight at 4° C. The affinity matrix was washed with the following sequence of buffers in order to remove non-covalently bound material: 0.1M phosphate, 0.1M phosphate+1.0M NaCl, 0.1M phosphate. The pH of all buffers were adjusted to 8.0. The affinity matrix was then washed with 0.2M ethanolamine (pH 8.0), to cap unreacted sites, for 1-3 hours at 4° C. The affinity matrix was then equilibrated with 0.1M phosphate, pH 7.0. The affinity matrix was stored at 4° C.; 0.1% sodium azide was added as a preservative. 96% of the immunoglobulin protein was immobilized as determined by analyzing, by reversed phase HPLC, the quantity of immunoglobulin protein remaining in solution. Immobilized antibody was immunologically active as determined by retention of its specific antigen somatrotropin when this peptide in solution was passed over a packed column of the antibody affinity matrix. Structurally unrelated peptides were not retained by the column.

EXAMPLE 16

5 g of Glutaraldehyde PEI-Silica Gel affinity matrix, produced according to Example 6, was washed with 0.1M acetate (pH 8.7) until the pH of effluent was equal to the pH of the wash (equilibration) buffer. 10 ml of 30 mg/ml chymotrypsin solution (in 0.1M acetate buffer, pH 8.7) was added to the affinity matrix. A concentrated protein solution was used in order to keep the reaction volume small and the reaction was allowed to proceed overnight at 5° C. The affinity matrix was washed with 0.1M acetate buffer pH 7.0 in order to remove non-covalently bound material. The affinity matrix was stored at 4° C. dry or in acetate buffer (pH 7.0): 2-propanol (9:1). 90% of the enzyme was immobilized as determined by analyzing, by reversed phase HPLC, the quantity of enzyme protein remaining in solution. The immobilized enzyme was packed into a glass column and was used as a chromatographic matrix to chromatograph amino acids and amino acid derivatives.

EXAMPLE 17

50 mg of Glutaraldehyde PEI-Silica Gel affinity matrix, produced according to Example 6, was washed with 0.05-0.1M phosphate (pH 7.5-8.5) until pH of effluent was equal to the pH of the wash (equilibration) buffer. 2.0 ml of 0.5 mg/ml galactose oxidase solution (in 0.05-0.1M phosphate or borate buffer, pH 7.5-8.5) was added to affinity matrix. A concentrated protein solution was used in order to keep the reaction volume small and the reaction was allowed to proceed overnight at 4° C. The affinity matrix was washed with the following sequence of buffers in order to remove non-covalently bound material: 0.1M phosphate, 0.1M phosphate +1.0M NaCl, 0.1M phosphate, the pH of all buffers were adjusted to 8.05. The affinity matrix was then washed with 0.2M ethanolamine or tris (pH 8.0), to cap unreacted sites, for 1-3 hours at 4° C. The affinity matrix was then equilibrated with 0.1M phosphate, pH 7.0. The affinity matrix was stored at 4° C. 98% of the enzyme was immobilized as determined by analyzing, by reversed phase HPLC, the quantity of enzyme protein remaining in solution. Immobilized enzyme was active as determined by a colorimetric oxidation-reduction reaction utilizing o-dianisidine.

EXAMPLE 18

Triazine PEI-Silica Gel affinity matrix, produced according to Example 3, was washed with 0.1M phosphate (pH 7.5) until the pH of effluent equilibrated to the pH of the wash buffer. 2.5 ml of a 1 mg/ml peroxidase solution (in 0.1M phosphate buffer, pH 7.5) was added to affinity matrix and allowed to react at room temperature for 4 hours. The affinity matrix was washed with the following sequence of buffers in order to remove non-covalently bound material: 0.1M phosphate, 0.1M phosphate+1.0M NaCl, 0.1M phosphate. A pH of 8.0 was used for all buffers. The affinity matrix was then washed with 0.2M ethanolamine (pH 8.0) for 1-3 hours at room temperature to cap unreacted sites. Then the affinity matrix was equilibrated with 0.1M phosphate, pH 7.0. The affinity matrix was stored at 4°

C. The immobilization process was followed by monitoring the absorbance at 280 nm of the supernatant from the reaction suspension. 54% of the enzyme in solution was absorbed. The immobilized enzyme exhibited 55% of the activity of an equivalent amount of soluble enzyme.

EXAMPLE 19

50 mg of Glutaraldehyde PEI Silica Gel affinity matrix was thoroughly washed with 0.1M phosphate buffer, pH 8 and equilibrated in the same buffer. 2.5 ml of a 0.8 mg/ml solution of β-galactosidase was added to the affinity matrix suspension and the rate of immobilization was followed by monitoring the absorbance at 280 nm of the supernatant. After 20 hours at 4° C. 73% of the enzyme was bound to the matrix, and exhibited 40% of the specific activity of soluble enzyme.

We claim:

1. In a method of separating or purifying a substance from solution by binding the substance in solution with an affinity matrix having a ligand for the substance covalently bound to the affinity matrix, the improvement comprising employing as the affinity matrix a solid phase support selected from the group containing of:

(a) a support of the general formula

wherein Silica-PrSi-PEI is a covalently bound, non-crosslinked polyethyleneimine bonded phase solid support which is the reaction particle of (1) a) particulate silica gel having an average particle diameter of from about 1 to 200 microns and an average pore size of from about 0 to 1000 Angstrom units, or b) particulate controlled pore glass having an average particle diameter of from about 1 to about 200 microns and an average pore size of from about 0 to about 1000 Angstrom units, with (2) polyethyleneiminopropyl trimethoxy silane having an average molecular weight of from about 400 to about 1800, or (b) the weakly acidic carboxylated product of the Silica-PrSi-PEI-(R)$_x$ solid support with a dibasic acid anhydride, said carboxylic product containing from about 0.3 to about 1.2 carboxyl milliequivalents per gram, and wherein R in the case of the non-weakly acidic carboxylated support is the residue of any chemically reactive moiety capable of undergoing nucleophilic substitution at two separate sites, such that R becomes covalently linked to both primary and secondary amino groups of the PEI at one such site while having the other site available and reactive for subsequent nucleophilic substitution under non-denaturing conditions by an affinity chromatography ligand to form a second covalent bond stable under aqueous hydrolytic buffer conditions and x is a positive integer less than or equal to the total number of primary or secondary amino groups in the PEI moiety, and in the case of the weakly acidic carboxylated support R is the residue of any chemically reactive moiety capable of facilitated nucleophilic displacement of the carboxyl hydroxyl to form a covalent bond at the carboxyl carbon, creating thereby a sufficiently electrophilic site, so as to be readily displaced at the carboxyl carbon by a nucleophilic functional group on an affinity chromatography ligand, and x is a positive integer less than or equal to the total number of carboxyl groups in the carboxylated PEI moiety, said support having an affinity chromatography ligand for the substance covalently bound to the support.

2. A method of separating or purifying a substance from solution by binding the substance in solution with an affinity matrix having a ligand for the substance covalently bound to the affinity matrix according to claim 1 wherein the silica gel has an average particle diameter of about 3 to about 70 microns and an average pore size of about 50 to about 1000 Angstrom units.

3. In a method of separating or purifying a substance from solution by binding the substance in solution with an affinity matrix having a ligand for the substance covalently bound to the affinity matrix, the improvement comprising employing as the affinity matrix a solid phase support selected from the group consisting of:

(a) a support of the general formula

wherein Silica-PrSi-PEI is a covalently bound, non-crosslinked polyethyleneimine bonded phase solid support which is the reaction product of (1) a) particulate silica gel having an average particle diameter of from about 1 to 200 microns and an average pore size of from about 0 to 1000 Angstrom units, or b) particulate controlled pore glass having an average particle diameter of from about 1 to about 200 microns and an average pore size of from about 0 to about 1000 Angstrom units, with (2) polyethyleneiminopropyl trimethoxy silane having an average molecular weight of from about 400 to about 1800, or (b) the weakly acidic carboxylated product of the Silica-PrSi-PEI-(R)$_x$ solid support with a dibasic acid anhydride, said carboxylated product containing from about 0.3. to about 1.2 carboxyl milliequivalents per gram, and wherein R in the case of the non-weakly acidic carboxylated support is the residue of any chemically reactive moiety capable of undergoing nucleophilic substitution at two separate sites, such that R becomes covalently linked to both primary and secondary amino groups of the PEI at one such site while having the other site available and reactive for subsequent nucleophilic substitution under non-denaturing conditions by an affinity chromatography ligand to from a second covalent bond stable under aqueous hydrolytic buffer conditions and x is a positive integer less than or equal to the total number of primary or secondary amino groups in the PEI moiety, and in the case of the weakly acidic carboxylated support R is the residue of any chemically reactive moiety capable of facilitated nucleophilic displacement of the carboxyl hydroxyl to form a covalent bond at the carboxyl carbon, creating thereby a sufficiently electrophilic site, so as to be readily displaced at the carboxyl carbon by a nucleophilic functional group on an affinity chromatography ligand, and x is a positive integer less than or equal to the total number of carboxyl groups in the carboxyl PEI moiety and wherein said R residues are selected from the group consisting of:

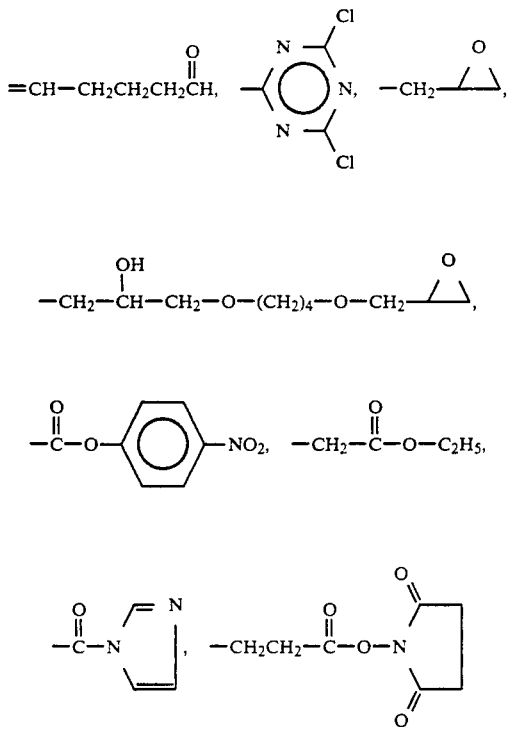

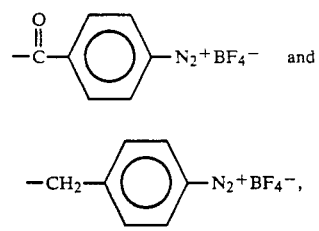

-continued

 and

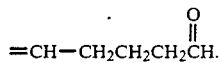

said support having an affinity chromatography ligand for the substance covalently bound to the support.

4. A method of separating or purifying a substance from solution by binding the substance in solution with an affinity matrix having a ligand for the substance covalently bound to the affinity matrix according to claim 3 wherein the silica gel has an average particle diameter of about 3 to about 70 microns and an average pore size of about 50 to about 1000 Angstrom units.

5. A method according to claim 4 wherein R is:

$$=CH-CH_2CH_2CH_2\overset{O}{\overset{\|}{C}}H.$$

6. A method according to claim 3 wherein R is:

$$=CH-CH_2CH_2CH_2\overset{O}{\overset{\|}{C}}H.$$

* * * * *